US007225981B2

(12) United States Patent
Jongebloed

(10) Patent No.: US 7,225,981 B2
(45) Date of Patent: Jun. 5, 2007

(54) ADAPTIVE NETWORK-CENTRIC ONLINE AUTONOMIC SUPPLY CHAIN MANAGEMENT SYSTEM

(75) Inventor: Kenneth William Jongebloed, Cocoa Beach, FL (US)

(73) Assignee: Kenneth Jongebloed, Inc., Cocoa Beach, FL (US)

( * ) Notice: Subject to any disclaimer, the term of this patent is extended or adjusted under 35 U.S.C. 154(b) by 104 days.

(21) Appl. No.: 10/755,246

(22) Filed: Jan. 10, 2004

(65) Prior Publication Data

US 2005/0154653 A1 Jul. 14, 2005

(51) Int. Cl.
*G06F 19/00* (2006.01)
*G08B 13/14* (2006.01)

(52) U.S. Cl. .................. 235/385; 340/572.1; 700/225; 705/10

(58) Field of Classification Search .............. 705/7–10, 705/22, 28, 29; 235/385; 340/572.1; 700/225
See application file for complete search history.

(56) References Cited

U.S. PATENT DOCUMENTS

| | | | | |
|---|---|---|---|---|
| 5,424,944 A | * | 6/1995 | Kelly et al. .................. 705/28 |
| 5,953,707 A | * | 9/1999 | Huang et al. ................. 705/10 |
| 6,434,458 B1 | * | 8/2002 | Laguer-Diaz et al. ......... 701/35 |
| 6,622,056 B1 | * | 9/2003 | Lindell ....................... 700/106 |
| 6,826,607 B1 | * | 11/2004 | Gelvin et al. ............... 709/224 |
| 6,859,757 B2 | * | 2/2005 | Muehl et al. ................ 702/184 |
| 6,885,854 B2 | * | 4/2005 | Stewart .................... 455/277.1 |
| 6,885,902 B2 | * | 4/2005 | Crampton et al. ............ 700/99 |
| 6,889,197 B2 | * | 5/2005 | Lidow .......................... 705/10 |
| 6,898,472 B2 | * | 5/2005 | Crampton et al. ............ 700/97 |
| 6,922,687 B2 | * | 7/2005 | Vernon .......................... 707/1 |
| 6,934,540 B2 | * | 8/2005 | Twitchell, Jr. ............ 455/422.1 |
| 6,972,682 B2 | * | 12/2005 | Lareau et al. ............. 340/568.1 |
| 7,027,808 B2 | * | 4/2006 | Wesby ......................... 455/419 |
| 7,042,346 B2 | * | 5/2006 | Paulsen ....................... 340/438 |
| 7,042,366 B1 | * | 5/2006 | Mui et al. .............. 340/825.25 |
| 7,133,704 B2 | * | 11/2006 | Twitchell, Jr. .............. 455/574 |
| 7,171,475 B2 | * | 1/2007 | Weisman et al. ........... 709/227 |

* cited by examiner

*Primary Examiner*—Andrew Joseph Rudy
(74) *Attorney, Agent, or Firm*—Mark R. Malek; The Torpy Group, P.L.

(57) ABSTRACT

Provided is an agile, adaptive, globally deployable online network-centric autonomic supply chain management system that when triggered by a predictive/diagnostic condition management system, without user-maintainer intervention, autonomously authorizes a complete requisitioning cycle of supply chain assets to warfighters with unprecedented criticality of speed. A requisitioning cycle is comprised of: (1) asset issue authorization to a vehicle/requester (2) retrograde [return] of repairable to depot and (3) replenishment [resupply] of drawn inventory. It also autonomically provides global total asset visibility of the asset(s) of interest and a tempo surge-priority ranking with a calm-down functions. The system operates in either default autonomic mode or a user activated semi-autonomic mode. In either mode of operation a requisition cycle is accomplished autonomically by selection of the most affordable transportation that ensures delivery of an asset to a user in accordance with contractually specified time-definite delivery standards. The system's material delivery performance effectiveness percentage rate is archived for billing purposes and monitoring system performance metrics. The system almost eliminates SCM administration personpower requirements. It accelerates the entire logistics supply pipeline, resulting in:— higher annual inventory turn-rates thus permitting inventory levels to be reduced and smaller wartime pack up kits thereby lowering lifetime total operating costs. Smaller pack up kits reduces the logistics footprint and thus the number of cargo aircraft required to deploy a unit.

14 Claims, 2 Drawing Sheets

Basic Premise – An asset (spare / consumable / repair part) is provided upon request and replenished; it is only retrograded to a BVRS if it's SM&R code indicates it's repairable.

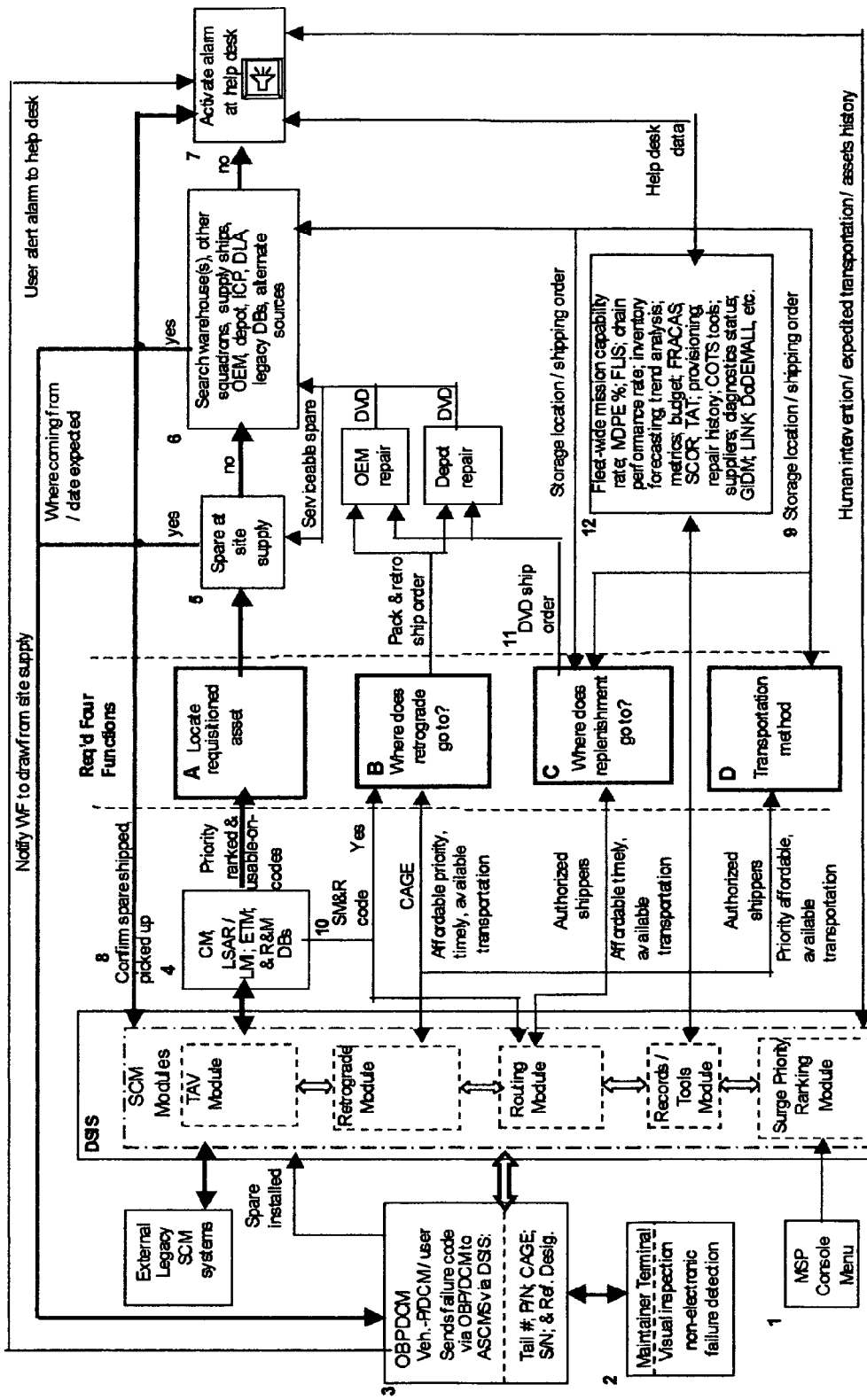

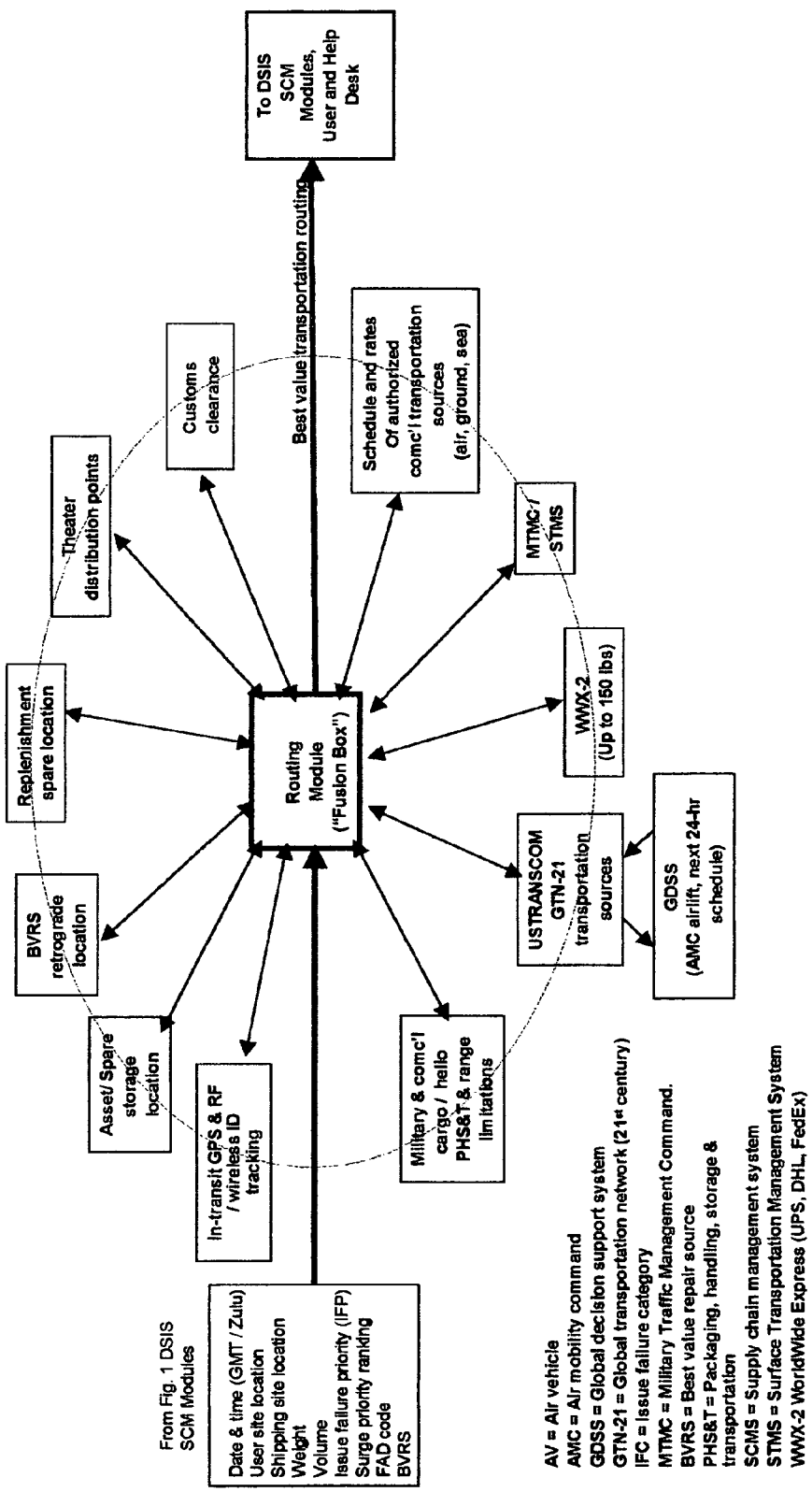

ADAPTIVE NETWORK-CENTRIC ONLINE AUTONOMIC SUPPLY CHAIN MANAGEMENT SYSTEM

An adaptive, agile, globally deployable, online Autonomic Supply Chain Management System (ASCMS) process control that autonomously authorizes a requisition cycle of supply chain assets without human intervention. A requisition cycle is comprised of (1) asset issue to user from inventory, (2) retrograde of repairable back to a Best Value Repair Source (BVRS) and (3) replenishment/resupply of drawn inventory stock. Just like your body's autonomic nervous system unconsciously controls your heart and breathing rate in reaction to a crisis, the ASCMS autonomically responds to peacetime normal supply system demand and adapts as well to an increased tempo, alert, emergency conditions, or wartime operations. The ASCMS is driven by the requirement to satisfy a sortie generation rate by variant requirement. The process emphasizes the criticality of speed, and can be characterized as a system relying on transportation speed and information replacing inventory mass.

CROSS-REFERENCE TO RELATED APPLICATIONS

The inventor performed a search of the USPTO patent database via the Internet and did not find any prior application related to autonomic supply chain management systems.

STATEMENT REGARDING FEDERALLY SONSORED RESEARCH AND DEVELOPMENT

Not Applicable—federal funds were not used for research or development.

REFERENCE TO SEQUENCE LISTING, A TABLE, OR A COMPUTER PROGRAM LISTING COMPACT DISC APPENDIX

Not Applicable.

BACKGROUND OF THE INVENTION

This autonomic supply chain management system transforms timely affordable delivery of assets/spares to warfighters. Today's current military and commercial automatic Supply Chain Management (SCM) systems are stovepiped, non-deployable, antiquated batched computer-processing systems. They are personpower labor intense requiring several handoffs between the user/requester and supply personnel at various storage sites, and take on average near 12-hours (some up to 24-hours) to process a requisition authorization for an asset(s)/spare(s). That is, to process the authorization to ship it or be advised it is not available in inventory—this does not include the time to perform the pick, pack and delivery transportation. Most SCM system designers would be happy for a future average of about two hours to process an automatic requisition to advise the user whether the asset(s) is available in inventory. And the two hours does not include processing the retrograde or replenishment transactions, versus this autonomic online/real-time processing system for all three requisition transactions.

Online processing immediately records the requisition transaction in the appropriate database(s) and provides real-time results. Whereas the antiquated batch processing collects inputs in a queue/file over time and enters them into the database at one time in a batch. Most of today's SCM systems were designed years ago as batched computer processing systems. That is, even though they may utilize mainframe computers they query another computer and must wait for a response, which could be 12 to 24-hours later. Years ago mainframe central processor unit time was expensive so they were implemented to do much of the processing in off-hours to reduce costs, thus the delay, especially SCM systems implemented in the 1980s, many of which are in use today. This is unacceptable for today's agile SCM high speed delivery requirements such as some Department of Defense (DoD) programs that require requisition authorization and delivery of some Continental United States (CONUS) spares/assets within 18-hours from requisition initiation.

For large military programs billions of dollars in reduced SCM personpower and reduced inventory can be saved by ASCMS during a vehicles lifetime of Operation and Service (O&S) period, and timelier asset deliveries are accomplished. A program's O&S period lifetime cost that typically costs 70% of a programs total can be expected to be reduced to 50% or below through use of an ASCMS, in part due to vastly reduced/eliminated SCM personpower needs, reduced size inventories as a result of the improved inventory turn rates, and faster delivery transportation. On a major DoD program now going through system development and demonstration phase a preliminary estimate of savings with this type autonomic system is a peacetime cost savings of $4.5 to $5 billion (in today dollars), and an O&S lifetime total operating cost savings including reduced inventory of over $100 billion dollars. But even more important than costs savings, is winning a conflict tempo surge by getting the right asset, to the right place, at the right time, in the right quantity.

It is projected an ASCMS versus today's automatic SCM systems can achieve improvement in time-definite delivery standards and every SCM metric, some of the more important improvements are as follows:

Annual inventory turn-rate improvement of better than 3.5 to 1;
Assets inventory reduction up to 70-percent;
Fill rate improvements of 25-percent;
On time Material Delivery Performance Effectiveness (MDPE) in excess of 99-percent;
Non-wartime transportation cost reduction of at least 12-percent.

ASCMS is designed to operate either with an intelligent agent "smart" Distributed Secure Information System (DSIS) or non-smart DSIS. It is envisioned in the not too distant future when atom/nano-computers are mainstream and capable of artificial intelligence, ASCMS will be able to operate over "brilliant" DSIS network-centric warfare networks capable of self-repair or rerouting around network outages, thus providing even greater SCM pipeline agility, efficiency, affordability and supportability to the warfighter.

Availability of spare assets is the backbone of logistics. Although there are 11-DoD logistics elements, if one were to ask a user/maintainer what the word logistics means to them, they most likely would respond with "spares."

BRIEF SUMMARY OF THE INVENTION

Provided is an adaptive, agile online network-centric Autonomic Supply Chain Management System (ASCMS) that when triggered by a Predictive/Diagnostic Condition Management (PDCM) system, without user-maintainer intervention, autonomously authorizes the complete requisitioning cycle (including asset issue instructions, retrograde [return] of repairable and replenishment [resupply] of drawn down inventory) of supply chain assets; provides tempo surge-priority ranking and calm-down functions; and provides global Total Asset Visibility (TAV). Normally it's utilized in support of but not limited to large-scale military and commercial supply chain programs such as in support of a fleet of vehicles (aircraft, Unmanned Aerial Vehicle (UAV), ships or ground tracked/wheeled, hereinafter referred to as a vehicle)). In the normal default mode of operation autonomic SCM software modules (the heart of the system) that are embedded within a DSIS autonomically authorize issue of requisitioned asset(s). It operates primarily in combination with three peripheral systems: (1) a vehicles PDCM system, (2) a distributed secure information system, and (3) a Configuration Management (CM) system. The requisitioning cycle process includes: (1) Supply chain management authorization of delivery of asset(s) including customs forms, (2) retrograde of repairable asset(s) to a BVRS, and (3) replenishment/resupply of asset(s) to the issuing location(s). These three requisition cycle transactions are accomplished by autonomic selection of the most affordable transportation source that ensures delivery of the asset in accordance with a contractually specified variable Time-Definite Delivery Standards (TDDS) in accordance with global region, weight and an Issue Failure Priority (IFP) code, and in compliance with a fixed MDPE percentage rate—(i.e., a reliability of 99+%, versus today's typical 87%).

In the semi-autonomic mode of operation, generally used for non-PDCM failures such as a maintainer visual inspection or troubleshooting that results in an asset need, and also for checking availability of an asset upon receipt of a predictive future failure code without ordering the asset, a user-maintainer may perform a search or input a requisition by one of several means. The ASCMS provides autonomic functions that accelerate the logistics supply pipeline by speeding up the delivery/retrograde of assets and eliminating or automating many of the labor-intense time-consuming actions required in legacy supply systems, along with a drastically higher turn-rate permitting inventory levels to be reduced thus lowering lifetime operating costs and reducing the logistics footprint, especially during cargo aircraft flyaway deployments.

ASCMS dramatically improves the entire SCM pipeline efficiency getting the spare asset to the user with maximum affordable speed, returning the repairable back to a repair depot (Original Equipment Manufacturer (OEM) or Government), replenishes the drawn down stock, and eliminates stove piping by sharing information. All vendors, suppliers and OEMs in addition to the military facilities are tied into the DSIS that drives the ASCMS, except special operations classified mission equipment TAV that is only available to authorized users. It accomplishes supply chain functions at minimum cost, with vastly reduced personpower, utilizing a minimum quantity of inventory assets and high-speed transportation from a minimum of storage facilities. The ASCMS software modules are designed in accordance with Open System Architecture (OSA) standards commonly used and widely supported interface standards, and meet OSA and interface standards that are supported by the market place. The software modules may be written/coded, or purchased modules used as is, or modified. The software module's protocol and data definitions must be fully compatible with embedding/interface with DSIS. ASCMS enables all applications to communicate with others by providing common interface applications, data definitions and communication protocols. They operate in combination with an integrated open standards interoperable DSIS, interfaced with an "as built-as-maintained"CM system and other interfaced supply support legacy/relational databases. An ASCMS provides to the requester the right quantity, in peacetime or wartime surge/sustainment/calm usage rate conditions, at the most affordable transportation that meets program TDDS on a fleet wide basis (not on a squadron level). It locates part availability through its TAV databases, whether it is in military storage, shipped direct from a supplier, or at a lateral/alternate source.

For vehicles not containing a PDCM the requisition process is operated in the semi-autonomous mode when initiated by a user, usually from a maintenance terminal. In either mode—autonomic or semi-autonomic, online delivery status is provided to the user-maintainer/the central high command help desk, with an alert function (aural/visual) to both if asset can't be delivered within TDDS. The help desk is key to administration of the ASCMS and provides 24/7 situational awareness. Autonomic functions may be overridden by an authorized higher-level user/help desk, but not by the requester. Override authorization is scaled based on surge-priority ranking—for example, only the most senior commander at the help desk center can authorize rerouting of an asset already en route to a Force Activity Designator (FAD) "1" (a special operation authorized by the President) user. The ASCMS autonomic tempo surge-priority ranking and calm-down capability function is based on relative importance of user mission objectives to ensure an asset is delivered to the user with the highest priority ranking in accordance with the TDDS and MDPE at the most affordable transportation cost. The ASCMS autonomically ensures that the user with the highest priority gets the needed part even if it is not at base/ship supply site.

Upon arrival at a new site or changed mission assignment a Mission Support Planner (MSP) inputs via a menu to the to the surge-priority ranking module the required ranking criteria. The ASCMS calculates from MSS inputs a prioritization rating, which can only be changed by a request to help desk personnel. This is necessary to prevent a command/wing or squadron from improving their priority and possibly getting spares that should have gone to a more critical mission. Criteria such as: —their site location; purpose of the deployment (rotational training, alert, or wartime surge, etc.); Force Activity Designator (FAD) priority of their deployment; date combat operations are expected to commence; duration of the deployment; site environmental conditions (desert, artic, tropical, etc.), vehicle variant and other factors to be determined by the designer. This is the connectivity "knowledge" the DSIS-ASCMS needs to globally commence autonomic operations. The system is now alerted that a squadron(s) has increased the tempo of operations and where it is located, etc.

When utilized in a military application and an authorized FAD 1 code has been assigned at the MSP console menu, a super-surge-priority ranking function is activated whereby most affordable transportation is not a consideration and assets are provided within the first 30-day period of surge (normally not provided until day 31 through 180) based upon vehicle variant sortie generation rate. A key element to efficient contractor managed military SCM programs is that spares/assets generally are owned (usually excluding common consumables and expendables) by the contractor(s). This permits sharing between military Services from a common inventory and immediate delivery without regard to funding source. If cannibalization of assets between vehicles is authorized by a military Service/command, greater efficiencies can be achieved.

BRIEF DESCRIPTION OF THE DRAWINGS

FIG. 1, entitled ASCMS Block Diagram illustrates a graphical flow of ASCM operation. The heaver flow line from block 3 via the DSIS block out to block 6 and back to 3 and 2, is the highlighted flow path of the autonomic mode requisition of an asset.

FIG. 2, entitled TDDS Transportation Routing is a block diagram illustrating how both commercial and military intermodal transportation sources are searched and selection of the most affordable transportation that meets TDDS is accomplished.

DETAILED DESCRIPTION OF THE INVENTION

General:

Keystone features of an autonomic system are: (1) a computer generated minimum 4-decimal place surge/calm priority ranking of each operational units vehicle. This is accomplished by inputting by a planner to a menu at the MSP console as squadron tempo increases/decreases. This ensures that a vehicle in a combat zone or other increased tempo receive priority over others lesser ranked; (2) an Off-Board Predictive/Diagnostic Condition Management (OBPDCM) system that assigns one of three IFP codes—from highest to lowest, namely: Grounded Vehicle, Not Grounded Emergency, or Routine are assigned for determination of TDDS by global location of requester. For non-PDCM failures such as a visual inspection, the IFP defaults to "Routine," with user permitted to request help desk approval to change to Grounded Vehicle, or Not Grounded Emergency requisition status. When authorized by higher authority if a requisition contains a FAD of 1, or other To Be Determined (TBD) ranking by the designer, its priority ranking actives a "super-surge" function and delivers the asset as quickly as possible without regard to transportation cost or day of surge-period; (3) TAV globally of database assets and provides location(s), movement, quantity, and status/condition.

See FIG. 1:

A vehicles priority to receive assets is based upon its assigned tempo surge-priority ranking that is accomplished by a MSP shown in FIG. 1, (block 1). A requisition is initiated at FIG. 1, (2 and 3) in real time by: (a) the site OBPDCM notification of a failure code and IFP code, or (b), by any vehicle/equipment having automatic fault detect capability when in the Autonomic mode, or (c), by the user/maintainer from a shop terminal as a result of a visual inspection of vehicle, support equipment, training system or any other equipment when in semi-autonomic mode. If the requisition is made in autonomic mode by the OBP/DCM an alert is (could be aural, visual or both) sent to the maintainers terminal for a five minute period after asset delivery schedule is determined so the maintainer may challenge it and alert the help desk to authorize a change.

FIG. 1, (3). When in the semi-autonomic mode after user confirmation of a predictive (PDCM system) failure code that includes determination of the remaining life or time span of proper operation of a component (versus diagnostic) or from a visual inspection/troubleshooting procedure, the user has the option of generating a menu driven input. This can be accomplished via a maintenance terminal, or entering the request via a voice recognition system, or if the vehicle is "chopped"/detached, the request may be up-linked to an OBPDCM which sends a requisition input to the DSIS SCM modules. The semi-autonomic mode also permits a user to search for availability of an asset without ordering it to ensure one will be locally available in the near future if the PDCM system indicates a Line Replaceable Component (LRC) or other asset is nearing it's serviceable lifetime but has not yet failed. The autonomic system performs the four primary required functions (see FIG. 1 heavy outlined blocks A through D). Upon completion of the four functions when in autonomic mode, an alarm alert (visual/aural) is provided at the maintainer site terminal providing a five-minute delay before activating the requisition cycle to allow a user to determine if delivery schedule is satisfactory. If there is no user intervention within the five-minute period the requisition cycle commences. If the user is not satisfied with projected delivery schedule s/he may alert the help desk and request human intervention.

The OBPDCM system (3) generates a failure code including IFP, vehicle number, a LRC Part/Number (P/N), Commercial and Government Entity (CAGE), Serial/Number (S/N) and Global Positioning Satellite (GPS) location, FIG. 1, (4) the Electronic Technical Manual (ETM) publication provides kits info and tools required for removal and installation, P/N, CAGE and S/N are used to obtain from the CM Database (DB), usable-on-code P/Ns, PHS&T instructions, weight and volume, and Source, Maintainability and Recoverability (SM&R) code from Logistics Support Analysis Record (LSAR)/Logistics Management Information (LMI). The site/base location is obtained from surge-priority ranking module. If there are multi-squadrons at a base/ship, the vehicle tail number alerts only respective operational unit. User has prerogative to alert help desk.

The first step of asset location is to compare the P/N, CAGE and S/N to the CM and Logistics Support Analysis (LSA)/LMI DBs to get proper hardware and SW revision levels and allowable replacement P/Ns, the packaged weight/volume which is provided to the routing and retrograde modules, and SM&R code. The Technical Manual provides information relative to "kit" parts, such as, if a pump is required—any gaskets and attaching parts that are needed if not in the pump package. The tail number is part of the usable-on code selection process.

FIG. 1, (5). The system first checks availability at the local site supply store room, providing the user availability, quantity, status and alerts supply to standby to get it ready for issue if available. Upon notification to the user that the asset is available, a text display is provided of a tracking number, part number, CAGE, software revision load, date/time of delivery arrival and site from which it is available. Also displayed to the user and supply personnel terminals is a partial page graphic of the asset or kit, the graphic is obtained from the electronic technical manual. The graphic display of the asset may be clicked on to enlarge it for ease of viewing. Upon acknowledgement of acceptance by the user of the asset (must be done within a variable period of up to five minutes or it autonomously is ordered) and it's delivery date/time a link to packing and packaging instructions is provided to the supply personnel's terminal. A link to packing and packaging instructions is always available to supply personnel; it may be looked up either by part number and CAGE or searched for by noun name.

FIG. 1, (6). If not at the site, a search of near-by sites, warehouses, supply ships, OEM, depots, Inventory Control Points (ICPs), Defense Logistics Agency (DLA), external legacy databases and alternate sources is performed. If found, it triggers the routing module to determine the most affordable routing to ensure delivery in accordance with the issue priority group, packaged weight (less than 80 pounds/more than 150 pounds), volume/dimensions, etc., and issues an electronic shipping document including customs clearance forms if required. The user is real-time notified the not-later-than-date/time the asset/spare is scheduled to arrive, where it is coming from so it can be tracked should it not be delivered on schedule, and at time of shipment receives a shipped confirmation. For forces deployed or afloat, delivery notification is to a theater distribution point. Any shipment or receipt at a site is bar code scanned and electronically entered into the CM system to maintain TAV.

FIG. 1, (7). If a spare is not found an alert alarm is activated at the help desk for human intervention. The help desk has access to status of spares in repair at OEMs and depots and can authorize expediting a repair if necessary, divert an in-transit delivery or take another course of action. The help desk has access to spare history—(cost, number of repairs, cost of repairs, etc.) via the Records/Tools module.

FIG. 1, (8). If a higher surge-priority ranked requisition is processed for the only available spare and a shipped confirmation has not been received, the system will divert the spare to the higher priority request and notify the lower priority. The help desk shall have capability to divert a shipment in-transit if desired.

FIG. 1, (9). By knowing the user base/ship location and location of the asset if at other than the users site, the routing module calculates the most affordable asset delivery schedule based on the TDDS, which is affected by the IFP code and SCM surge-priority ranking. It uses authorized commercial and military transportation sources. If in the first 30-days of surge when assets normally are not delivered, they may be delivered with authorization from the help desk, and are if a super-surge ranked vehicle makes a request.

FIG. 1, (10). If the SM&R code indicates the asset is repairable the retrograde module using the P/N and CAGE determines where the BVRS is located. In the event there is more than one BVRS site it selects which one to ship to by obtaining each sites backlog, shortest Turn Around Time (TAT), average cost of past repairs for that asset, and Title 10 50/50 sharing costs status inputs from the records/tools module. It then provides pack and ship orders to the shipping site supply personnel, assigns a tracking number and notifies the repair site it is about to be returned for repair. Unlike delivery of an asset to a user who's TDDS is based in part upon an IFP code, retrograde is accomplished at a default routine issue priority, versus grounded vehicle or not grounded emergency speed to minimize transportation cost unless TAV indicates the inventory minimum/maximum level is low, and then it utilizes a not grounded emergency priority speed TDDS. If asset is not repairable but also not coded for throwaway at organizational level it is returned to the OEM for disposal/use for salvage parts.

FIG. 1, (11). The storage location from which the spare is shipped, whether the user site or other, sends notification of shipment which triggers the replenishment spare to be directed to that location. The routing module looks at whether it should be Direct Vendor Delivery (DVD) from an OEM or depot, or from one or more storage locations, selecting the least number of moves that results in the lowest transportation cost. As with a retrograde, replenishment is accomplished at a default routine issue failure priority to minimize transportation costs. A tracking number is displayed to user and supply persons.

The records/tools module provides required historical data and SCM tools shown in FIG. 1, (12) for planning, supply chain management, logistics planning and customer management business processes to provide the SCM help desk with up-to-date records/tools information. A key function is the ability to display MPDE information to ensure contract requirements are met, which may affect billings, and for use in mining data to perform trend analysis with an eye to designing system improvements and thus system capabilities. Tools helpful in the systems approach to ASCMS design and later to lifetime identify and measure metrics in the chain and determine weak links would be Commercial-off-the-Shelf (COTS) models such as the Supply-Chain Council's—Supply-Chain Operations Reference-Model (SCOR). MDPE is recorded for all transactions, asset delivery, retrograde and replenishment. The MDPE percentage measures receipt of requested asset(s) to point where it is to be issued to the requester (not when installed by the warfighter) or if in a combat zone to the point designated for government forwarding. It can be set to display from one day to a five-year period. Percentages of on time retrograde and replenishment are also calculated but are not included in default MDPE rate, but are callable for trend analysis of system efficiency and effectiveness. Other functions included are: inventory forecasts, chain performance rate, data for trend analysis, supplier min./max. levels, repair Turn-Around Time (TAT), repair costs, frequency of failure, BVR diagnostic data, etc. The SCM tools may be a combination of COTS, modified COTS or developed specifically for use with the ASCMS.

Modes of Operation:

Autonomic Mode. Autonomic mode is the default mode and is activated when a vehicle is at a site/ship that contains an OBPDCM system. It is activated by a vehicle downloading via RF transmission while returning to a site having a ground based OBPDCM system, or after returning to site by inputting a copy of the vehicle's PDCM data into the OBPDCM system at which time a complete autonomic SCM requisition cycle is performed. When multiple LRC defect codes (an ambiguity group) for the same malfunction are downloaded/displayed, the OBPDCM only notifies site supply to get spares to the counter ready to issue but does not initiate retrograde or replenishment actions until the user determines the LRC/LRC's that are defective. Any asset or LRC identified and issued but not needed to affect a repair (even if installed and then removed) are returned to stores as serviceable.

Semi-Autonomic Mode. Semi-autonomic mode means a user-maintainer inputs a requisition at a terminal, it is used: (1) to requisition any asset that is not monitored by a vehicle's PDCM system or (2) when vehicle is in a communications blackout/silent zone and can't download while/after returning to site, or (3) to order an asset specific to a vehicle but shipped to a location other than the vehicle location, or (4) to order an asset not specific to any vehicle.

ASCMS Operation:

As-Built-Configuration. As a vehicle is being built and starts along the assembly line it is assigned a model/block number and S/N or in the case of an aircraft a tail number. This commences the start of a globally accessible as-built CM database. Every repair part/asset whether a LRC or other, has as a minimum a Part Number (P/N) and CAGE assigned specific to the OEM. Assets possessing modifiable form, fit or function are also assigned S/N's, thus assets with a P/N, CAGE and S/N can be uniquely identified by referring to other databases as to hardware/software revision levels. Every asset's P/N, CAGE and S/N are bar code scanned or manually entered at a terminal at time of installation into the master CM database. Thus, at the end of the assembly line the vehicle has a complete CM inventory of every asset installed on it. Like any other asset, when leaving the assembly line for delivery to a user the vehicle is scanned into the CM database and again upon receipt at its point of delivery. This process is repeated at each OEM's plant so the CM database knows what parts are installed in each LRC/asset delivered, or kept at in-plant inventory storage or shipped to a remote inventory storage site. Thus, the CM database knows the location, P/N, S/N, CAGE and hardware/software version of all assets—the foundation for TAV.

Total Asset Visibility (TAV). With a Universal Product Code (UPC) or European Article Number (EAN) bar coded decal/nameplate ranging from simple 2D bar codes through to intelligent tags attached to equipment assets containing P/N, CAGE and S/N any asset is completely identified permitting the ASCMS to have TAV. The four things TAV provides are location, movement, quantity and asset condition status (serviceable or not serviceable), all stored/located within the CM database. It has already been described that assets as built both by the OEM and again as assembled into vehicle are accounted for. Likewise those assets in storage at any warehouse whether it be land based or on a ship are scanned into the CM database upon receipt. DoD type warehouses are equipped with Automated Identification Technology (AIT) for rapid asset isle and bin retrieval and inventory management. Lastly, any asset being transported is also scanned into the database upon receipt at a shipping point. Thus, all assets location and quantity are known, and the SCM TAV module search eliminates those installed in a vehicle from consideration when searching for and displays only those in storage or in-transit.

A notation of status is entered into the CM database upon an assets removal from a vehicle, such as "not serviceable," or upon return to a depot such as "in repair." Thus the TAV location, quantity and status of assets is available online.

Tempo Surge-Priority Ranking and Calm-Down. An autonomic SCM system is autonomously adaptive and responsive to global demand requirements, both increased and reduced based on a vehicles surge-priority ranking. It further adapts to what day of a surge period it is. That means typically for days 1 through 30 of a combat deployment it allows no spare assets deliveries (unless a request for a super-surge vehicle is received) and the vehicle is dependent upon its wartime pack up kit for spares. For days 31 through 180 it allows delivery of assets. Thus it adapts to both the surge-priority ranking of a vehicle and to the day within the surge period. When a vehicles mission is changed such as returning from an Outside Continental United States (OCONUS) combat deployment to a CONUS site, a MSP inputs the change and the system starts a calm-down ranking process.

An ASCMS's reduced inventory asset quantities are calculated by vehicle variant type and characterized as a "just enough" inventory system that fulfills the current DoD supply vision. It replaces the past years philosophy of mass inventory (referred to as "just-in-case") and the more recent "just-in-time" inventory philosophies, and relies on information and transportation speed. Each vehicle has a computer assigned tempo surge-priority ranking depending upon location (such as CONUS or OCONUS) and mission objective, etc., that is derived from a console menu by a mission planner inputs. Upon arrival at a new site or if assigned a different mission objective a mission planner inputs the surge criteria via a console menu which makes it available to the ASCMS via the DSIS. The DoD assigns a deployment priority to an operational unit using the FAD code/Joint chiefs-of-staff (JCS) project code process that is input as part of the ranking. If two or more vehicles have the same surge-priority ranking, requisition fulfillment is on a first-come-first-served basis.

Table 1 provides sample notional surge-priority rankings that may be assigned by the ASCMS designer, the higher the ranking the higher the priority.

TABLE 1

Notional Assignments for Surge-Priority Ranking

| State No. | State | MSP Menu Input Priority | Remarks |
|---|---|---|---|
| | Peacetime | | |
| 1 | Normal operations - CONUS | 2 | |
| 2 | Normal operations - OCONUS | 3 | |
| 3 | Training exercise | 4 | |
| 4 | Plant assembly line | 5 | |
| 5 | At overhaul depot | 6 | |
| 6 | Aircraft on ground (AOG) | 7 | |
| 7 | Crash repair | 8 | |
| 8 | Special operations | 9 | |
| | Increased Tempo/Wartime | | |
| 9 | Pre-deployment buildup | 10 | |
| 10 | Aircraft on ground (AOG) | 11 | |
| 11 | In-transit to combat zone | 12 | |
| 12 | At combat site, days 1–7 | 13 | Spares provided by LFP unless a super surge |
| 13 | At combat site, days 8–30 | 14 | Spares provided by LFP unless a super surge |
| 14 | At combat site days 31–180 and beyond | 15 | Spares support by ASCMS |
| 15 | Re-surge within surge period | 16 | |
| 16 | Combat damage repair | 17 | |
| 17 | Special operations | 18 | |
| 18 | FAD 1 thru 4 | 19 thru 22 | FAD 1 = 22; FAD 4 = 19; |
| 19 | Crash disposal | 1 | |

Typical Operational Scenario. Upon delivery to an operational squadron, or upon a deployment/change in mission objective a surge-priority ranking for each vehicle is entered at the mission support planners console surge menu, resulting in four place decimal priority ranking. In autonomic mode of operation as a vehicle returns from a mission if a monitored failure has occurred it may perform a RF transmission of preventive/diagnostic failure data to the OBPDCM system. Included always is an IFP code, and either or both a LRC diagnostic failure code, and or a predictive (foretelling of a future failure) LRC out-of-nominal range code. These data are sent via the DSIS to the ASCMS, which notifies supply and the user-maintainer. If the requested asset is available on site/ship, the LRC should be at the vehicle upon parking. If required to be ordered from another location, the requisition is already sent to ensure rapid delivery. The SCM system autonomically ensures that the user with the highest priority gets the needed part even if it is not at base/ship supply site. It locates the asset to be shipped utilizing TAV, whether it is in storage at a nearby site, in global warehouse storage or to be shipped direct from a supplier, based on TDDS and most cost effect transportation. Authorization to ship is sent to the site having the asset, along with customs forms if required.

An OBPDCM failure code includes vehicle identification number, IFP, LRC P/N, CAGE, S/N and reference designation or airframe location. The ASCMS compares this data to the CM, LSAR-provisioning and ETM DB's to locate where an exact or useable-on-coded asset may be obtained and what tools and test equipment are required to perform the repair; the results are displayed at a maintenance terminal along with the asset's locations, quantities and status. The same information and additional is available to the help desk as desired. If the asset is available at local supply it is brought to the counter for issue, if not, the LSAR DB is queried for asset size, weight and volume. These three things must be known for selection of the method of transportation, example—can it fit into or be carried by a helicopter? The asset that can meet the TDDS at minimum cost is authorized for shipment to the requester.

Next the ASCMS ascertains if the asset being requested is repairable and is to be retrograded by examining the LSAR-provisioning DB for it's SM&R code and cost. If repairable it determines from P/N and CAGE where the BVRS is located. If more than one BVRS, for example an OEM and partner depot is being used, the records/tools module is queried for history of TAT, average cost of repair, quantity at each BVRS, etc., issues packing and packing instructions in the event they are required and authorization to retrograde including customs clearance if required to the selected BVRS.

TAV Module:

One of the key requirements for autonomic operation is knowing the global location, quantity and status in real-time of a system's assets via its Configuration Management (CM) database—known as Total Asset Visibility (TAV). TAV is broadly described as consisting of two categories: (1) In-place TAV, and (2) In-transit TAV. TAV for in-place assets (the majority of the systems assets) is provided by the systems "as built/as maintained" CM database. These include assets (1) on a vehicle or at a base/ship, (2) in warehouse storage, or (3) at a repair facility. Assets are bar code scanned upon arrival/installation or departure/removal from a facility, or vehicle into the CM database, which is globally accessible by the autonomic system and by any user via DSIS, thus providing: location, Part Number (P/N), CAGE and S/N. With P/N, CAGE and S/N known any asset is uniquely identified, because the CM database has access to the LSA/LMI, TM, and Reliability & Maintainability (R&M) databases via DSIS which provides as applicable hardware configuration revision, software revision level, usable-on-code applicability, cost, packaged weight/dimensions/volume, container status (conditions such as pressure, temperature, humidity, etc.), and asset DoD security classification (TS, S, C) and any special transport requirements such as armed guard. When searching for an asset for shipment the autonomic system only considers those not installed on a vehicle, unless the search is for an asset needed for a FAD 1 vehicle and it can not be found in inventory.

Because the autonomic SCM system knows when the operational unit/vehicle commenced combat via the surge-priority ranking inputs at the MSP console, it autonomically starts replenishment support following the Logistics Footprint (LFP) support period, days 1-30, and for the wartime sustained single sortie days, 31 through 180 and beyond, (system default values). However, should it become necessary to re-surge during the 31-180 day period due to another conflict, the replenishment rate shall be increased to deployment LFP spares level (day one level) plus any other required spares that may be back ordered, when authorized by a priority change request to the help desk. Replenishment spares may be air lifted to land-based squadrons. For forces afloat they may be delivered to the next port-of-call, or by Vertical Replenishment (VERTREP), Connected Replenishment (CONREP), or Carrier Onboard Delivery (COD), or any combination thereof.

DSIS when used for military purposes provides a deployable secure direct interface with external legacy systems providing TAV to Government owned common consumables (some legacy systems may not provide online capability). It further allows access to alternate commercial sources, and SCM supply chain management functions such as item management, forecasting, autonomic requisitioning, and optimization of transportation and warehousing. A secure network must meet Defense Information Infrastructure (DII) Common Operating Environment (COE) interoperability standards and preferably be compatible with the DoD Command, Control, Communications and Computer-Intelligence (C4I) that is advanced computer generator scrambled is required, to ensure security classified data such as military deployment and mission information is not compromised. Vendors not connected directly the C4I network may use the Internet for transmission of classified information to the DSIS by use of trusted, secure service providers. Such providers already offer secure services under contract to the military and other institutions.

If "chopped"/detached from home base/ship to an austere field or even an established airport without an OBPDCM system, requisition is initiated by user from vehicle either by a PDCM satellite uplink, entering request from a keyboard, radio, or a secure C4I land phone.

The transportation portion of a military contractual TDDS time span (typically 18-hours to 10-days) is by far the biggest bottleneck and therefore the target to aggressively attack and reduce. This design utilizes multiple innovative ways such as: most affordable air bills/rates via use of web-search for best CONUS and OCONUS scheduling of both military and commercial transport, similar to a web search such as by Orbitz.com or Travelocity.com sites for comparing a commercial airline ticket price versus schedule. The system looks at the site location of the request and the IFP priority and then selects the TDDS applicable. The system then inputs the TDDS along with the assets weight and volume and searches for the most affordable timely transportation from the systems inventory warehouse/storage points.

Inventory warehouses preferably should be located at a combined military MAC base—commercial hub if possible, if not, where they are a short drive away.

TAV for in-transit assets is provided in two ways, by the Global Transportation Network (GTN) and by Differential Global Positioning Satellite (DGPS). In-transit asset location is broadly described as consisting of two categories: Waypoint In-transit TAV, and Continuous In-transit TAV.

Waypoint in-transit TAV may be provided by the Radio Frequency Identification (RFID) network. The technology is used to track asset containers in storage or on aircraft, trucks, trains and ships. For high value or high-level security items it is seen as the long-term successor to bar codes. Radio tags can carry more information about the asset, can be RF scanned more rapidly and assets can be found even if they are hidden in cartons or behind other products. The RFID network currently (which is expanding) spans 40-countries, comprised of over 400-nodes at seaports, airports, rail terminals, and military bases. It utilizes a set of standards-American National Standards Institute (ANSI) and International Standards Organization (ISO) using one of the few frequency bands generally available worldwide. RFID electronic tags support full electronic manifests of the container/package contents that are read by wireless readers deployed at strategic checkpoints/waypoints worldwide, feeding information on location, status (such as in-repair, retrograding for repair, or ready for issue, etc.), condition of sealed containers and other events into a global web-based software platform and asset management application.

Continuous In-transit TAV for authorized high value assets, priority/super-surge assets, and high level security classified assets when in a military application tracking may be provided by an inverted DGPS. A positioning transceiver equipped container/package that may be queried by an authorized user, also know as GPS locator, or may be programmed for fixed interval position transmission. After fixing an assets location relative to a network of GPS satellites orbiting approximately 12,000 miles above the earth, locator services transmit the constantly updated information to a central database, where location can be retrieved via the DSIS. When used in a commercial application a radio transceiver such as General Mobile Radio Service (GMRS) or beacon is most likely utilized.

Retrograde Module:

The retrograde module determines the place of return of a repairable to a BVRS) site/depot that could be the OEM depot, a government depot, or alternate source at the most affordable transportation. Retrograde is performed at a routine issue priority and is not TDDS dependent but its delivery schedule is displayed and the user may request help desk approval for a different date if a short supply warrants it. Retrograde is accomplished by knowing the location of the site at which the asset is at, and determines where it must be shipped for repair. The primary determination is made initially by two factors: part number and CAGE if there is a single BVRS. If more than one BVRS exists for an asset further consideration includes the number in repair at each BVRS—obtained from TAV, the cost history of repair at a site and the history of Turn Around Time (TAT) both of which are obtained from the records/tools module. Lastly consideration for United States Government (USG) Title 10 rule for 50/50 sharing of annual repair funds must be accounted for, also obtainable from the records/tools module. When these factors have been measured the routing module determines the most affordable transportation and shipping instructions are issued to the site having the repairable. Retrograde delivery time (days) to get the repairable back to a depot is not as critical as the asset's delivery to the user and does not require user acceptance. This is to be determined by the designer, unless inventory is at the minimum level and then it switches to a IFP not grounded emergency from a routine IP.

Routing Module:

The routing module selects the timeliest delivery of asset to a user IAW the TDDS at most affordable method of transportation. This is accomplished by inputting data (see FIG. 2) to the "Fusion Box" which interrogates all military and commercial intermodal delivery schedules and tariff fares for ground, air and sea to locate the most affordable method of transportation for the requisitioned asset, retrograde, and replenishment. The multiple search results are displayed in best delivery date/time order of sequence along with the cost to the user and are available also to the help desk. If a super-surge-ranking condition exists the fastest delivery without regard to cost is selected. Getting an asset timely to a user is of most importance, the retrograde and replenishment is usually accomplished at a lesser routine pace unless the stock inventory and usage rates obtained from the records/tools module indicate a faster mode of transportation is desired because of recent heavy demand or short inventory.

Inputs to the transportation routing module that are used to calculate the most affordable TDDS for asset delivery are comprised of the following items 1. through 8:
1. Date & time (GMT, same as military Zulu)
2. User site location
3. Shipping site location
4. Weight (packaged)
5. Volume (packaged)
6. Issue failure priority (IFP)
7. Surge priority ranking
8. FAD code
9. Best value repair source (BVRS)

Inputs to the transportation routing module that are used to calculate replenishment (items 1 through 5) and retrograde (items 1 through 5 and 9) are accomplished at a routine priority and at the most affordable transportation. Replenishment and retrograde routing is not TDDS dependent to make the system as affordable as possible, but its scheduled arrival at destination schedule is displayed and the user may request help desk approval for a different date if a low inventory supply warrants it.

Records/Tools Module:

There are two primary purposes for the Records/Tools module: (1) archiving all ASCMS transactions, and (2) allowing ASCMS administrators and help desk persons access to SCM software tools that allow accurate assessments and evaluations with an emphasis on spares requirements to meet sortie generation rates. The records/tools module also archives the ASCMS MDPE operational efficiency. Whatever the MDPE percentage rate that is established for a system is archived to enable billings to be adjusted accordingly if the MDPE is a contractual requirement, and to provides a look back at system metrics to permit designers to improve the systems operational efficiency where required. FIG. 1, (12) shows archiving of SCM asset deliveries, retrograde and replenishment is accomplished via the interface with the DSIS, and all communication and actions between users and help desk are also recoded.

Some of typical software tools are shown in FIG. 1, (12), other software tools for system administration are at the discretion of the administrators. They generally are COTS tools, but the administrators may design some as long as they are OSA compatible.

Simulation Model Testing:

The ASCMS may be tested during design and development in an electronics model simulation laboratory prior to fielding.

Acronyms, Abbreviations, Signs and Symbols

Note: The following acronyms, abbreviations, signs and symbols are those used in text or on drawings. Some acronyms are listed even though they may appear only once because they may be more easily recognizable in that form.

| | |
|---|---|
| / | Virgule (meaning alternative, which ever is appropriate or both) |
| 2D | Two dimensional |
| AIT | Automated identification technology |
| ANSI | American national standards institute |
| ASCMS | Autonomic supply chain management system |
| BVRS | Best value repair source |
| C | Confidential |
| C4I | Command, control, communications and computer intelligence |
| CAGE | Commercial and government entity code |
| CM | Configuration management |
| COE | Common operating environment |

-continued

Note: The following acronyms, abbreviations, signs and symbols are those used in text or on drawings. Some acronyms are listed even though they may appear only once because they may be more easily recognizable in that form.

| | |
|---|---|
| CONREP | Connected replenishment |
| CONUS | Continental United States |
| COTS | Commercial-off-the-shelf |
| DB | Database |
| DGPS | Differential global satellite position |
| DII | Defense information infrastructure |
| DLA | Defense logistics agency |
| DoD | Department of Defense |
| DSIS | Distributed secure information system |
| DVD | Direct vendor delivery |
| EAN | European article number |
| ETM | Electronic technical manual |
| FAD | Force activity designator |
| FLIS | Federal logistics information system |
| FMECA | Failure mode, effect and criticality analysis |
| FRACAS | Failure reporting, analysis, and corrective action system |
| GIDM | Government/industry mart |
| GMRS | General mobile radio service |
| GPS | Global positioning satellite |
| GTN | Government transportation network |
| IAW | In accordance with |
| ICP | Inventory control point |
| IFP | Issue failure priority |
| ISO | International standards organization |
| JCS | Joint chiefs-of-staff |
| LFP | Logistics footprint |
| LINK | Logistics information network |
| LMI | Logistics management information |
| LRC | Line replaceable component |
| LSA | Logistics support analysis |
| LSAR | Logistics support analysis record |
| MDPE | Material delivery performance effectiveness |
| MSP | Mission support planner |
| O&S | Operation and service |
| OBPDCM | Off-board predictive/diagnostic condition maintenance |
| OCONUS | Outside continental United States |
| OEM | Original equipment manufacturer |
| OSA | Open system architecture |
| P/N | Part number |
| PDCM | Predictive/diagnostic condition management |
| R&M | Reliability & maintainability |
| RFID | Radio frequency identification |
| S | Secret |
| S/N | Serial number |
| SCOR | Supply-chain operations reference-model |
| SCM | Supply chain management |
| SM&R | Source, maintainability & recoverability code |
| TAT | Turn around time |
| TAV | Total asset visibility | affordable transportation. Replenishment and retrograde routing is not TDDS dependent to make the system as affordable as possible, but its scheduled arrival at destination schedule is displayed and the user may request help desk approval for a different date if a low inventory supply warrants it.

Records/Tools Module:

There are two primary purposes for the Records/Tools module: (1) archiving all ASCMS transactions, and (2) allowing ASCMS administrators and help desk persons access to SCM software tools that allow accurate assessments and evaluations with an emphasis on spares requirements to meet sortie generation rates. The records/tools module also archives the ASCMS MDPE operational efficiency. Whatever the MDPE percentage rate that is established for a system is archived to enable billings to be adjusted accordingly if the MDPE is a contractual requirement, and to provides a look back at system metrics to permit designers to improve the systems operational efficiency where required. FIG. 1, (12) shows archiving of SCM asset deliveries, retrograde and replenishment is accomplished via the interface with the DSIS, and all communication and actions between users and help desk are also recoded.

Some of typical software tools are shown in FIG. 1, (12), other software tools for system administration are at the discretion of the administrators. They generally are COTS tools, but the administrators may design some as long as they are OSA compatible.

Simulation Model Testing:

The ASCMS may be tested during design and development in an electronics model simulation laboratory prior to fielding.

Acronyms, Abbreviations, Signs and Symbols

Note: The following acronyms, abbreviations, signs and symbols are those used in text or on drawings. Some acronyms are listed even though they may appear only once because they may be more easily recognizable in that form.

| | |
|---|---|
| / | Virgule (meaning alternative, which ever is appropriate or both) |
| 2D | Two dimensional |
| AIT | Automated identification technology |
| ANSI | American national standards institute |
| ASCMS | Autonomic supply chain management system |
| BVRS | Best value repair source |
| C | Confidential |
| C4I | Command, control, communications and computer intelligence |
| CAGE | Commercial and government entity code |
| CM | Configuration management |
| COE | Common operating environment |
| CONREP | Connected replenishment |
| CONUS | Continental United States |
| COTS | Commercial-off-the-shelf |
| DB | Database |
| DGPS | Differential global satellite position |
| DII | Defense information infrastructure |
| DLA | Defense logistics agency |
| DoD | Department of Defense |
| DSIS | Distributed secure information system |
| DVD | Direct vendor delivery |
| EAN | European article number |
| ETM | Electronic technical manual |
| FAD | Force activity designator |
| FLIS | Federal logistics information system |
| FMECA | Failure mode, effect and criticality analysis |
| FRACAS | Failure reporting, analysis, and corrective action system |
| GIDM | Government/industry mart |
| GMRS | General mobile radio service |
| GPS | Global positioning satellite |
| GTN | Government transportation network |
| IAW | In accordance with |
| ICP | Inventory control point |
| IFP | Issue failure priority |
| ISO | International standards organization |
| JCS | Joint chiefs-of-staff |
| LFP | Logistics footprint |
| LINK | Logistics information network |
| LMI | Logistics management information |
| LRC | Line replaceable component |
| LSA | Logistics support analysis |
| LSAR | Logistics support analysis record |
| MDPE | Material delivery performance effectiveness |
| MSP | Mission support planner |
| O&S | Operation and service |
| OBPDCM | Off-board predictive/diagnostic condition maintenance |
| OCONUS | Outside continental United States |
| OEM | Original equipment manufacturer |
| OSA | Open system architecture |
| P/N | Part number |
| PDCM | Predictive/diagnostic condition management |
| R&M | Reliability & maintainability |

-continued

Note: The following acronyms, abbreviations, signs and symbols are those used in text or on drawings. Some acronyms are listed even though they may appear only once because they may be more easily recognizable in that form.

| | |
|---|---|
| RFID | Radio frequency identification |
| S | Secret |
| S/N | Serial number |
| SCOR | Supply-chain operations reference-model |
| SCM | Supply chain management |
| SM&R | Source, maintainability & recoverability code |
| TAT | Turn around time |
| TAV | Total asset visibility |
| TBD | To be determined |
| TDDS | Time-definite delivery standard |
| TS | Top secret |
| UAV | Unmanned aerial vehicle |
| UPC | Universal product code |
| USG | United States government |
| Veh. | Vehicle |
| VERTREP | Vertical replenishment |
| TBD | To be determined |
| TDDS | Time-definite delivery standard |
| TS | Top secret |
| UAV | Unmanned aerial vehicle |
| UPC | Universal product code |
| USG | United States government |
| Veh. | Vehicle |
| VERTREP | Vertical replenishment |

I claim:

1. A supply chain management system that authorizes an autonomic requisition cycle, the supply chain management system comprising:
a predictive diagnostic condition management system carried by a vehicle to transmit a failure code using a radio frequency (RF) transmitter;
an off-board predictive diagnostic condition management system spaced-apart from said predictive diagnostic condition management system that receives the at least one failure code using a radio frequency receiver, and generates at least one off-board predictive diagnostic condition management failure code responsive to the received at least one failure code; and
a software based distributed secure information system in data communication with said off-board predictive diagnostic condition management system via a data bus to receive the at least one off-board predictive diagnostic condition management failure code, said distributed secure information system comprising a plurality of software modules in communication with one another via data busses to authorize delivery of at least one vehicle asset to a location of the vehicle from an issuing location, to authorize delivery of the vehicle asset from the location of the vehicle to a repair source, and to replenish the at least one vehicle asset to the issuing location;
wherein the at least one failure code is transmitted from said predictive diagnostic condition management system of the vehicle to said off board predictive diagnostic condition management system using an RF signal, and wherein the at least one failure code is carried by the data bus between said off-board predictive diagnostic condition management system and said distributed secure information system and between the software modules of said distributed secure information system.

2. A supply chain management system according to claim 1 wherein delivery of the at least one vehicle asset is autonomically authorized responsive to the at least one off-board predictive diagnostic condition management failure code.

3. A supply chain management system according to claim 1 wherein the at least one off-board predictive diagnostic condition management failure code includes a vehicle number, an issue failure priority code, a part number, a commercial and government entity code, a serial number, and a location of the asset on the vehicle.

4. A supply chain management system according to claim 1 wherein one of the plurality of software modules is a total asset visibility module for determining availability of the at least one vehicle asset at a local site, and for searching other sites if the at least one vehicle asset is not available at the local site.

5. A supply chain management system according to claim 4 wherein said total asset visibility module provides real-time global location, quantity and status of vehicle assets in place and in transit.

6. A supply chain management system according to claim 4 further comprising a configuration management and a logistics support analysis record, both in data communication with said total asset visibility module to compare the at least one off-board predictive diagnostic condition management failure code to the at least one vehicle asset.

7. A supply chain management system according to claim 1 wherein the requisition cycle is semi-autonomously initiated by a user to authorize delivery of the at least one vehicle asset to the vehicle, and to determine availability of the at least one vehicle asset.

8. A supply chain management system according to claim 1 wherein one of the plurality of software modules is a retrograde module in data communication with a logistics support analysis record, and comprising a source, maintainability, and recoverability code for determining if the vehicle asset is repairable, and to determine a location of the repair source.

9. A supply chain management system according to claim 1 wherein one of the plurality of software modules is a routing module to determine routing of the at least one vehicle asset.

10. A supply chain management system according to claim 9 wherein said routing module calculates an asset delivery schedule of the at least one vehicle asset based on at least one of a time definite delivery standard and material delivery performance effectiveness.

11. A supply chain management system according to claim 1 wherein one of the plurality of software modules is a records module for providing historical data and material delivery performance effectiveness data.

12. A supply chain management system according to claim 1 wherein one of the plurality of software modules is a surge priority ranking module for determining priority of delivery of the at least one vehicle asset from the issuing location to the location of the vehicle.

13. A supply chain management system according to claim 1 further comprising at least one alert alarm that is activated when a predetermined condition exists; and wherein the predetermined condition is at least one of inability to locate the at least one vehicle asset, and an inability to deliver the at least one vehicle asset within a time definite delivery standard.

14. A supply chain management system according to claim 1 wherein the at least one vehicle asset includes a bar code affixed thereto for identification.

* * * * *